Patented Mar. 26, 1929.

1,707,181

UNITED STATES PATENT OFFICE.

MAX WEILER, OF WIESDORF-ON-THE-RHINE, AND BERTHOLD WENK AND HERMANN STÖTTER, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

CONDENSATION PRODUCT FROM P-HALOGENATED PHENOLIC COMPOUNDS AND ALDEHYDES.

No Drawing. Application filed March 13, 1928, Serial No. 261,402, and in Germany March 25, 1927.

The present invention relates to a process for the manufacture of condensation products from p-halogenated phenolic compounds and aldehydes and to new products obtainable thereby.

We have found, that new condensation products are obtainable by reacting with aldehydes in the presence of a suitable condensing agent such as sulfuric acid, hydrochloric acid+glacial acetic acid, $ZnCl_2$, upon such phenolic compounds as contain at least one hydroxy group, at least one halogen atom in the p-position to a hydroxy group, at least one free o-position to a hydroxy group and which may be substituted in the nucleus by indifferent substituents such as halogen atoms, alkyl groups e. a.

Among the phenolic compounds capable to react with aldehydes in the manner referred to above p-chlorophenol, p-bromophenol, 1-hydroxy-2.4-dichlorobenzene, 1-hydroxy-3-methyl-4-chlorobenzene, 1-hydroxy-2-methyl-4-chlorobenzene, 4-chloro-1-naphthol or mixtures of such compounds may be mentioned by way of example. As aldehydes as well aliphatic as aromatic aldehydes may be used; among the first form-aldehyde, among the latter such aldehydes containing sulfo groups f. i. sulfo-benzaldehydes, especially o-sulfobenzaldehyde yield condensation products of high technical value. Among the suitable condensing agents we prefer sulfuric acid the concentration of which may vary in wide limits depending from the components to be condensed. For instance, when reacting with formaldehyde upon p-chlorophenol, a sulfuric acid of about 50% strength will be advantageous, whereas when replacing the p-chlorophenol by 1-hydroxy-2.4-dichlorobenzene and the formaldehyde by o-sulfobenzaldehyde, a sulfuric acid of about 96% strength yields the best results. In some cases it will be advantageous to add glacial acetic acid to the sulfuric acid solution of the components. The temperature at which reaction takes place also varies in wide limits but may range in the most cases from about 15 to 70° C. The same is to be said about the time after which the condensation is finished. It may vary from about 3 hours to 3 days.

The products thus obtainable in the most cases probably correspond to the general formula:

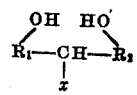

wherein $R_1$ and $R_2$ stand for the residues of p-halogen phenolic compounds, $x$ stands for hydrogen, an aliphatic or aromatic residue, the hydroxy groups being in o-position to the $-\underset{|}{CH}-$ group. In some cases the condensation products will be higher molecular and also these products are included in our invention.

The new products form colorless or nearly colorless powders which are soluble in alkalis, difficultly soluble in water except those as contain sulfo groups and which are efficacious in protecting cloths against moths and similar insect pests.

The following examples illustrate our invention without limiting it thereto:

*Example 1.*—16.3 parts by weight of 2.4-dichlorophenol are dissolved in a mixture of 60 parts by weight of glacial acetic acid and 40 parts by weight of sulfuric acid monohydrate and 5.5 parts by weight of an aqueous solution of formaldehyde (29%) are added. After heating for several hours to 50 to 70° C. the mass is poured into water and filtered from the precipitate. In order to remove small quantities of unattacked dichlorophenol steam may be blown through or the same may be dissolved in caustic soda solution, which is precipitated by pouring into dilute acid. The product of the condensation having the probable formula:

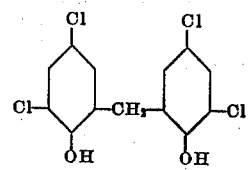

is a nearly colorless powder easily soluble in alkaline and ligroin.

The condensation can likewise be effected with another of the customary condensing agents, 2-methyl-4-chlorophenol, parachlorophenol, parabromophenol also can be condensed with formaldehyde in a similar manner. In the case of parachlorophenol the resulting condensation product having probably the formula:

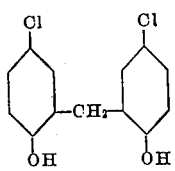

may contain besides the normal product, which is completely soluble in hot ligroin, smaller or larger quantities of a substance which dissolves in ligroin with great difficulty. The quantity of the latter substance varies with the temperature and time of the reaction, the relative proportion of the two starting materials as well as with the concentration and quantity of the condensing agent. The crude product containing both substances is equally well suitable for use as a moth proofing agent.

Instead of the formaldehyde, other aliphatic aldehydes, for example, acetaldehyde or chloral e. a. may also be condensed with the phenolic compounds mentioned.

*Example 2*—51.4 parts by weight of parachlorophenol and 28.7 parts by weight of parachlorobenzaldehyde are added to a mixture of 80 parts by weight of glacial acetic acid and 320 parts by weight of sulfuric acid monohydrate. When after several hours stirring at 20–25° C. the quantity of the condensation product no further increases the melt is poured into water. The reaction product is filtered, dissolved in caustic soda solution, separated from a very small quantity of undissolved substance by filtration and poured into dilute acid. The resulting product of the probable formula:

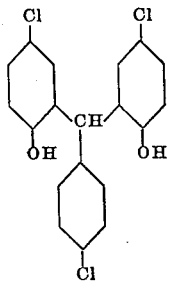

is filtered and dried. Instead of the mixture of acids, aqueous sulfuric acid or other acids, zinc chloride, aluminium chloride, ferric chloride and the like may be used as condensing agents.

The p-chlorophenol may be replaced by other phenols before-mentioned. Instead of para chlorobenzaldehyde other aromatic aldehydes, for example, benzaldehyde, 2.6-dichloro-3-hydroxybenzaldehyde, 2.4.6-trichloro-3-hydroxybenzaldehyde, hydroxynaphthaldehyde e. a. may be employed.

*Example 3.*—103 parts by weight of p-chlorophenol are added to a solution of 75 parts by weight of o-sulfo-benzaldehyde in 800 parts by weight of a sulfuric acid of 75% strength. When after about 27 hours stirring at 30° C. the quantity of the condensation product no further increases the melt is poured into water, neutralized with slaked lime and filtered. The solution of the Ca-salt thus obtained is treated with sodium carbonate until the Ca-salt has changed into the sodium salt. By filtering, evaporating and drying the sodium salt of the compound of the probable formula:

is obtained which forms as well as the free sulfonic acid a nearly colorless powder easily soluble in water and is efficacious in combating moths and other insecticidal pests.

Instead of the o-sulfobenzaldehyde other sulfo-benzaldehydes may be used as for example m-sulfo-benzaldehyde, 2-chloro-5-sulfobenzaldehyde e. a.

Also it is not necessary to isolate the sulfobenzaldehydes from the sulfonating mixture, but the process here described may be performed by diluting the sulfonating mixture in a suitable manner, adding the p-halogen phenolic compounds and working in the manner described before.

The application of the products of the present invention to the moth proofing of materials forms the subject matter of our copending application Serial No. 261,403, filed Mar. 13, 1928.

We claim:

1. Process which consists in causing an aldehyde to be reacted upon by such phenolic compounds as contain at least one hydroxy group, at least one halogen atom in the p-position to a hydroxy group, at least one free o-position to the hydroxy group and which may be substituted in the other positions by indifferent substituents in the presence of a suitable condensing agent.

2. Process, which consists in causing an aldehyde to be reacted upon by such phenolic compounds as contain at least one hydroxy group, as least one halogen atom in the p-position to a hydroxy group, at least one free o-position to the hydroxy group and which may be substituted in the other positions by indifferent substituents in the presence of a suitable condensing agent at temperatures from about 15 to 70° C. and for a time ranging from 3 hours to 3 days.

3. Process, which consists in causing an aldehyde to be reacted upon by a phenolic compound which contains one hydroxy group, a halogenatom in the p-position to the hydroxy group, at least one free o-position to the hydroxy group and which may be substituted in the other positions by indifferent substituents in the presence of a suitable condensing agent at temperatures from about 15 to 70° C. and for a time ranging from 3 hours to 3 days.

4. Process, which consists in causing an aldehyde to be reacted upon by a phenolic compound which contains one hydroxy group, a halogenatom in the p-position to the hydroxy group, at least one free o-position to the hydroxy group and which may be substituted in the other positions by indifferent substituents in the presence of sulfuric acid in a suitable concentration at temperatures from about 15 to 70° C. and for a time ranging from 3 hours to 3 days.

5. Process, which consists in causing an aldehyde to be reacted upon by a phenolic compound which contains one hydroxy group, a halogenatom in the p-position to the hydroxy group, at least one free o-position to the hydroxy group and which may be substituted in the other positions by indifferent substituents, in the presence of sulfuric acid in a suitable concentration at temperatures from about 15 to 70° C. and for a time ranging from 3 hours to 3 days, with the addition of glacial acetic acid.

6. Process, which consists in causing an aromatic aldehyde to be reacted upon by a phenolic compound which contains one hydroxy group, a halogenatom in the p-position to the hydroxy group, at least one free o-position to the hydroxy group and which may be substituted in the other positions by indifferent substituents, in the presence of a suitable condensing agent at temperatures from about 15 to 70° C. and for a time ranging from 3 hours to 3 days.

7. Process, which consists in causing a sulfo-benzaldehyde to be reacted upon by a phenolic compound which contains one hydroxy group, a halogenatom in the p-postion to the hydroxy group, at least one free o-position to the hydroxy group and which may be substituted in the other positions by indifferent substituents, in the presence of a suitable condensing agent at temperatures from about 15 to 70° C. and for a time ranging from 3 hours to 3 days.

8. Process, which consists in reacting with an aldehyde upon a phenolic compound of the general formula:

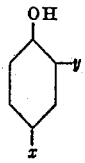

wherein $x$ stands for halogen, $y$ means a hydrogen atom which may be replaced by a substituent of the group comprising halogens and the methyl group in the presence of sulfuric acid in a suitable concentration at temperatures from about 15 to 70° C. and for a time ranging from 3 hours to 3 days.

9. Process, which consists in reacting with an aldehyde upon a phenolic compound of the general formula:

wherein $x$ stands for a chloro atom, $y$ means hydrogen, which may be replaced by a chloroatom in the presence of sulfuric acid in a suitable concentration at temperatures from about 15 to 70° C. and for a time ranging from 3 hours to 3 days.

10. Process, which consists in reacting with an aromatic aldehyde upon a phenolic compound of the general formula:

wherein $x$ stands for a chloro atom, $y$ means a hydrogen which may be replaced by a chloroatom, in the presence of sulfuric acid in a suitable concentration at temperatures from about 15 to 70° C. and for a time ranging from 3 hours to 3 days.

11. Process, which consists in reacting with a sulfobenzaldehyde upon a phenolic compound of the general formula:

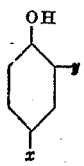

wherein $x$ stands for a chloro atom, $y$ means a hydrogen which may be replaced by a chloroatom, in the presence of sulfuric acid in a suitable concentration at temperatures from about 15 to 70° C. and for a time ranging from 3 hours to 3 days.

12. Process which consists in reacting with o-sulfobenzaldehyde, dissolved in sulfuric acid of 75% strength upon p-chlorophenol at a temperature of about 30° C. for about 24 hours.

13. As new products, the condensation products obtainable by reacting with aldehydes upon such phenolic compounds as contain at least one halogen atom in the p-position to a hydroxy group, at least one free o-position to a hydroxy group and which may be substituted in the other positions by indifferent substituents, in the presence of a suitable condensing agent at temperatures from about 15 to 70° C. and for a time ranging from 3 hours to 3 days, said products being colorless or nearly colorless powders, which are soluble in alkalies, only difficultly soluble in water except those as contain sulfogroups and which are efficacious in protecting cloths against moths and other insect pests.

14. The compounds of the probable general formula:

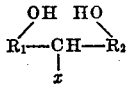

wherein $R_1$ and $R_2$ stand for the residues of p-halogen-phenolic compounds, $x$, stands for hydrogen, an aliphatic or aromatic residue, the hydroxy groups being in o-position to the —CH— group, said products being colorless or nearly colorless powders, which are soluble in alkalies, only difficultly soluble in water except those as contain sulfo groups and which are efficacious in protecting cloths against moths and other insect pests.

15. The compounds of the probable formula:

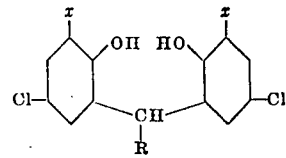

wherein R stands for an aromatic nucleus which may be substituted, the two $x$ stand for hydrogen atoms which may be replaced by chloroatoms, said products being colorless or nearly colorless powders, which are soluble in alkalies, only difficultly soluble in water except those as contain sulfo groups and which are efficacious in protecting cloths against moths and other insect pests.

16. The compound of the probable formula:

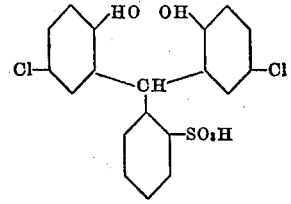

being a nearly colorless powder easily soluble in water and alkalies and being efficacious in protecting cloths against moths and other insect pests.

In testimony whereof we have hereunto set our hands.

MAX WEILER.
BERTHOLD WENK.
HERMANN STÖTTER.